US012745772B2

(12) United States Patent
Jaetsch et al.

(10) Patent No.: US 12,745,772 B2
(45) Date of Patent: Sep. 29, 2026

(54) BIOCIDAL MIXTURES

(71) Applicant: LANXESS Deutschland GmbH, Cologne (DE)

(72) Inventors: Thomas Jaetsch, Cologne (DE); Katrin Moews, Dortmund (DE)

( * ) Notice: Subject to any disclaimer, the term of this patent is extended or adjusted under 35 U.S.C. 154(b) by 438 days.

(21) Appl. No.: 18/273,299

(22) PCT Filed: Dec. 21, 2021

(86) PCT No.: PCT/EP2021/087051
§ 371 (c)(1),
(2) Date: Jul. 20, 2023

(87) PCT Pub. No.: WO2022/156984
PCT Pub. Date: Jul. 28, 2022

(65) Prior Publication Data

US 2024/0306640 A1 Sep. 19, 2024

(30) Foreign Application Priority Data

Jan. 22, 2021 (EP) .................................... 21152913

(51) Int. Cl.
*A01N 43/54* (2006.01)
*A01N 47/12* (2006.01)
*A01P 3/00* (2006.01)

(52) U.S. Cl.
CPC ............. *A01N 43/54* (2013.01); *A01N 47/12* (2013.01); *A01P 3/00* (2021.08)

(58) Field of Classification Search
CPC ...................................................... A01N 43/54
See application file for complete search history.

(56) References Cited

U.S. PATENT DOCUMENTS

| | | | | |
|---|---|---|---|---|
| 4,276,211 A | 6/1981 | Singer et al. | | |
| 5,759,786 A * | 6/1998 | Hsu | A01N 43/80 | 424/404 |
| 11,957,128 B2 * | 4/2024 | Clawson, Jr. | A01N 25/02 | |
| 2006/0083726 A1 * | 4/2006 | Lysyk | A01N 63/23 | 424/93.461 |
| 2008/0206295 A1 * | 8/2008 | Bernardini | A01N 47/12 | 424/490 |

FOREIGN PATENT DOCUMENTS

| | | | | |
|---|---|---|---|---|
| JP | 2003073211 A * | 3/2003 | | |
| JP | 2003073211 A2 | 3/2003 | | |
| WO | 08047097 A1 | 4/2008 | | |
| WO | WO-2008047097 A1 * | 4/2008 | A01N 43/80 | |

OTHER PUBLICATIONS

Registry/Zregistry (CAS RegistrySM) Sep. 2016 2 pages.*
Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
Sikkerhetsdatablad: DRYGOLIN Pluss Oljedekkbeis, Mar. 29, 2019 (Mar. 29, 2019), XP055811015.
Sikkerhetsdatablad: DRYGOLIN Pluss Oljedekkbeis, Nov. 20, 2020 (Nov. 20, 2020), XP055811463.
Office Action issued by the European Patent Office for European Application No. 21843952.9, dated Feb. 7, 2025 (English machine translation & original).
Kull, F.C., Eismann, H.D. Sylvestrowicz, R.L. Mayer, Applied Microbiology 1961, 9, pp. 538-541.
International Search Report from corresponding International Application No. PCT/EP2021/087051, dated Mar. 25, 2022, three pages.
Technical Datasheet: DRYGOLIN Pluss Oljedekkbeis, Nov. 3, 2020 (Nov. 3, 2020), Seiten 1-5, XP055811001, Sandefjord, Norway, Gefunden im Internet: URL:https://www.jotun.com/Datasheets/Download?url=/TDS/TDS_28421_DRYGOLIN+Pluss+oljedekkbeis_Nor_NO.pdf [gefunden am Jun. 7, 2021].
"Sikkerhetsdatablad: DRYGOLIN Pluss Oljedekkbeis", May 21, 2021 (May 21, 2021), Seiten 1-12, XP055811009, Sandefjord, Norway, Gefunden im Internet: URL:https://www.jotun.com/Datasheets/Download?url=/SDS/ SDS_28421_DRYGOLI N%20 Pluss%20oljedekkbeis_Nor_NO. pdf [gefunden am Jun. 7, 2021].

* cited by examiner

*Primary Examiner* — Nizal S Chandrakumar

(57) ABSTRACT

The invention relates to specific biocidal mixtures that contain IPBC and azoxystrobin, to their preparation, to coating agents containing them and to their use in inhibiting or controlling the growth of mold fungi on or in surface coatings.

10 Claims, No Drawings

BIOCIDAL MIXTURES

The invention relates to specific biocide mixtures comprising IPBC and azoxystrobin, to the preparation thereof, to coating compositions comprising them and to the use thereof for inhibiting or controlling the growth of molds on or in surface coatings.

U.S. Pat. No. 4,276,211 already discloses the use of IPBC (3-iodopropynyl N-butylcarbamate) in coating compositions to protect against mold infestation. However, the use of IPBC on its own still has disadvantages.

In order to improve the spectrum of activity of coating composition preparations against molds, it was therefore necessary to search for a more effective solution. For example, in EP-A-431752 IPBC is combined with DCOIT (4,5-dichloro-2-n-octyl-4-isothiazolin-3-one) as mixing partner (see Table 1 therein) in order to achieve this aim. However, DCOIT is now to be avoided in more and more areas of application, and so alternative mixing partners had to be sought for an improved effect compared with IPBC as individual active ingredient.

Other mixtures of IPBC are for example those with specific strobilurins, such as kresoxim-methyl, which are already described in the examples of JP-A-2003073211 for wood-destroying fungi. However, such a mixture still has disadvantages for other applications, particularly the use in aqueous coating compositions such as paints, for the purpose of protecting the film against molds such as the Ascomycetes and Deuteromycetes.

The object of the present invention was therefore to find improved biocide mixtures which are suitable in particular for the use in aqueous coating compositions such as paints, for the purpose of protecting the film against molds such as the Ascomycetes and Deuteromycetes.

Biocide Mixture

What was surprisingly found was a biocide mixture comprising the biocides a) azoxystrobin (methyl(E)-2-{2-[6-(2-cyanophenoxy) pyrimidin-4-yloxy]phenyl}-3-methoxyacrylate), or also abbreviated to AZO in the text below, and b) IPBC, the weight ratio of components a) to b) being from 6:1-1:6, preferably from 1.8:1-1:6, in particular from 1.5:1-1:6.

In a preferred embodiment, the biocide mixture according to the invention comprises the two components a) and b) at a total of more than 90% by weight, in particular of more than 95% by weight and particularly preferably of more than 99% by weight, based on the sum total of all biocides. Examples of preferred biocides that may also be used are in-can preservatives such as OIT (2-octyl-2H-isothiazol-3-one) and/or BIT (1,2-benzothiazol-3-one), the total proportion of which is preferably less than 5%, preferably less than 1%, by weight of the biocide mixture, based on the sum total of the biocides.

The biocide mixture according to the invention may optionally further comprise various auxiliaries such as interface-active substances, defoamers, wetting agents, emulsifiers, dispersants, stabilizers, adhesives, protective colloids, spreading agents, fragrances, colorants, buffer substances, buffer systems, pH regulators, thickeners, dedusting agents, flow agents, release agents, in-can preservatives or mixtures thereof. For the auxiliaries mentioned below, it is also possible in each case, independently of one another, that they are not present. The amounts are each based on the biocide mixture. Examples of possible auxiliaries are:

Interface-active substances, such as surfactants. Surfactants may for example be nonionic, cationic and amphoteric surfactants, preferably anionic surfactants. Anionic surfactants are for example alkyl sulfates, alkyl ether sulfates, alkylarylsulfonates, alkyl succinates, alkyl sulfosuccinates, N-alkoyl sarcosinates, acyl taurates, acyl isethionates, alkyl phosphates, alkyl ether phosphates, alkyl ether carboxylates, alpha-olefin-sulfonates, in particular the alkali metal and alkaline earth metal salts, for example sodium, potassium, magnesium, calcium, and ammonium and triethanolamine salts. The alkyl ether sulfates, alkyl ether phosphates and alkyl ether carboxylates may in each case have for example from 1 to 10 ethylene oxide or propylene oxide units, preferably 1 to 3 ethylene oxide units. Suitable are for example sodium lauryl sulfate, ammonium lauryl sulfate, sodium lauryl ether sulfate, ammonium lauryl ether sulfate, sodium lauryl sarcosinate, sodium oleyl succinate, ammonium lauryl sulfosuccinate, sodium dodecylbenzenesulfonate, triethanolamine dodecylbenzenesulfonate. Based on the biocide mixtures, from 0.01% to 10% by weight of the interface-active substances may for example be present, preferably from 0.2% to 8% by weight, particularly preferably from 0.3% to 5% by weight and very particularly preferably from 0.5% to 3% by weight.

Defoamers. The defoamers used are generally interface-active substances which are only weakly soluble in the surfactant solution. Preferred defoamers are those which are derived from natural fats and oils, petroleum derivatives or silicone oils. Based on the biocide mixtures, from 0.01% to 5% by weight of the defoamers may for example be present, preferably from 0.05% to 3% by weight, particularly preferably from 0.1% to 1.5% by weight.

Wetting agents, such as alkali metal salts, alkaline earth metal salts and ammonium salts of aromatic sulfonic acids, for example ligno-, phenol-, naphthalene- and dibutylnaphthalenesulfonic acid, and of fatty acids, alkyl- and alkylarylsulfonates, alkyl, lauryl ether and fatty alcohol sulfates, and salts of sulfated hexa-, hepta- and octadecanols or fatty alcohol glycol ethers, condensation products of sulfonated naphthalene and its derivatives with formaldehyde, condensation products of naphthalene or of naphthalenesulfonic acids with phenol and formaldehyde, polyoxyethylene octylphenol ether, ethoxylated isooctyl-, octyl- or nonylphenol, alkylphenol or tributylphenyl polyglycol ethers, tristerylphenyl ether ethoxylates, alkylaryl polyether alcohols, isotridecyl alcohol, fatty alcohol ethylene oxide condensates, ethoxylated castor oil, polyoxyethylene alkyl ethers or polyoxypropylene, lauryl alcohol polyglycol ether acetate, sorbitol esters, lignosulfite waste liquors or methylcellulose. Based on the biocide mixtures, from 0.01% to 8% by weight of the wetting agents may for example be present, preferably from 0.2% to 6% by weight, particularly preferably from 0.3% to 5% by weight and very particularly preferably from 0.5% to 3% by weight.

Emulsifiers, such as sodium, potassium and ammonium salts of straight-chain aliphatic carboxylic acids of chain length $C_{10}$-$C_{20}$, sodium hydroxyoctadecanesulfonate, sodium, potassium and ammonium salts of hydroxy fatty acids of chain length $C_{10}$-$C_{20}$ and the sulfation or acetylation products thereof, alkyl sulfates, also in the form of triethanolamine salts, alkyl-($C_{10}$-$C_{20}$)-sulfonates, alkyl-($C_{10}$-$C_{20}$)-arylsulfonates, dimethyldialkyl-($C_8$-$C_{18}$)-ammonium chloride, acyl, alkyl, oleyl and alkylaryl oxethylates and the sulfation products thereof, alkali metal salts of sulfosuccinic esters with aliphatic saturated monovalent alcohols of chain length $C_4$-$C_{16}$, sulfosuccinic 4-esters with polyethylene glycol ethers of monovalent aliphatic alcohols of chain length $C_{10}$-$C_{12}$ (disodium salt), sulfosuccinic 4-esters with polyethylene glycol nonylphenyl ether (disodium salt), bis(cyclohexyl) sulfosuccinate (sodium salt), lignosulfonic acid and the calcium, magnesium, sodium and ammonium salts thereof, polyoxyethylene sorbitan monooleate having 20 ethylene oxide groups, resin acids, hydrogenated and dehydrogenated resin acids and the alkali metal salts thereof, dodecylated sodium diphenyl ether disulfonate, and copolymers of ethylene oxide and propylene oxide, preferably with a minimum content of 10% by weight of ethylene oxide. Preferably, the emulsifiers used are: sodium lauryl sulfate, sodium lauryl ether sulfate, ethoxylated (3 ethylene oxide groups); the polyethylene glycol(4-20) ethers of oleyl alcohol, and the polyethene oxide (4-14) ethers of nonylphenol. Based on the biocide mixtures, from 0.01% to 15% by weight of the emulsifiers may for example be present, preferably from 0.02% to 8% by weight, particularly preferably from 0.05% to 6% by weight and very particularly preferably from 0.1% to 5% by weight.

Dispersants, such as alkylphenol polyglycol ethers, polyacrylates, and polymeric carboxylates. Based on the biocide mixtures, from 0.01% to 15% by weight of the dispersants may for example be present, preferably from 0.02% to 8% by weight, particularly preferably from 0.05% to 6% by weight and very particularly preferably from 0.1% to 5% by weight.

Stabilizers, such as cellulose and cellulose derivatives, and antioxidants, radical scavengers or UV absorbers. Based on the biocide mixtures, from 0.01% to 6% by weight of the stabilizers may for example be present, preferably from 0.01% to 3% by weight, particularly preferably from 0.01% to 2% by weight and very particularly preferably from 0.01% to 1% by weight.

Adhesives and/or protective colloids, such as carboxymethylcellulose, polyvinylpyrrolidones and derivatives thereof, natural and synthetic pulverulent, granular or latex-like polymers, polyvinyl alcohol, polyvinyl acetate, and natural phospholipids, such as cephalins and lecithins, and synthetic phospholipid, and paraffin oils. Based on the biocide mixtures, from 0.01% to 8% by weight of the adhesives and/or protective colloids may for example be present, preferably from 0.05% to 4% by weight, particularly preferably from 0.2% to 3% by weight and very particularly preferably from 0.2% to 2% by weight.

Spreading agents, such as isopropyl myristate, polyoxyethylene nonylphenyl ether and polyoxyethylene laurylphenyl ether. Based on the biocide mixtures, from 0.01% to 20% by weight of the spreading agents may for example be present, preferably from 0.1% to 10% by weight, particularly preferably from 0.1% to 5% by weight and very particularly preferably from 0.1% to 2% by weight.

Fragrances and/or colorants, such as inorganic pigments, for example iron oxide, titanium oxide, Prussian blue, and organic dyes, such as alizarin, azo and metallophthalocyanine dyes, and trace nutrients such as salts of iron, manganese, boron, copper, cobalt, molybdenum and zinc. Based on the biocide mixtures, in each case from 0.001% to 4% by weight of the fragrances and/or colorants may for example be present, preferably from 0.01% to 1% by weight, particularly preferably from 0.01% to 0.8% by weight.

Buffer substances, buffer systems and/or pH regulators. Based on the biocide mixture, in each case from 0.01% to 10% by weight of these may for example be present, preferably from 0.1% to 5% by weight.

Thickeners, such as polysaccharides, xanthan gum, sodium or magnesium silicates, heteropolysaccharides, alginates, carboxymethylcellulose, gum arabic or polyacrylic acids, preferably xanthan gum. Based on the biocide mixture, in each case from 0.01% to 10% by weight of the thickeners may for example be present, preferably from 0.1% to 5% by weight.

Dedusting agents are for example polyglycols and polyglycol ethers. Based on the biocide mixtures, in each case from 0.01% to 2% by weight of the dedusting agents may for example be present, preferably from 0.05% to 1% by weight, particularly preferably from 0.1% to 0.5% by weight of dedusting agents.

As flow agents and/or release agents, for example natural rock flours, such as kaolins, clays, talc, marble, chalk, quartz, bentonite, smectite, attapulgite, montmorillonite or diatomaceous earth, or synthetic inorganic substances, such as finely divided silica, alumina and silicates, may be present, or Mg salts of fatty acids or mixtures thereof may be used. Based on the biocide mixtures, in each case from 0.01% to 15% by weight of these may be present, preferably from 0.05% to 8% by weight, particularly preferably from 0.1% to 5% by weight of flow agents and/or release agents.

In-can preservatives are for example biocides, bactericides and fungicides. Based on the biocide mixtures, in each case from 0.01% to 2% by weight of these may for example be present, preferably from 0.05% to less than 1% by weight of in-can preservatives.

The total content of auxiliaries, in particular of those mentioned above, based on the biocide mixtures is preferably from 0.001% to 20% by weight, more preferably from 0.1% to 15% by weight and particularly preferably from 0.1% to 10% by weight.

The biocide mixture according to the invention may be present in various forms, for example as solid formulations, such as powder mixtures or as granules, preferably water-dispersible granules, which may also comprise, in addition to the active ingredients of components a) and b), solid auxiliaries such as the abovementioned flow agents and/or release agents such as natural rock flours, such as kaolins, clays, talc, marble, chalk, quartz, bentonite, smectite, attapulgite, montmorillonite or diatomaceous earth, or synthetic inorganic substances, such as finely divided silica, alumina and silicates or mixtures thereof.

The solid formulations may be obtained in a manner known per se for example by intimate mixing of components a) and b) in the specified weight ratio with the preferably solid auxiliaries and preferably subsequent common comminution. Furthermore, the solid formulations may be obtained by drying, for example spray drying, of a liquid formulation.

Preferred solid formulations comprise for example from 10% to 100% by weight of components a) and b) in the specified weight ratio, preferably from 15% to 98% by weight.

The biocide mixture according to the invention may also be in the form of a liquid formulation, for example in the form of suspensions, dispersions, gels or pastes.

Preferred liquid formulations are aqueous dispersions. The liquid, in particular aqueous, formulations of the biocide mixture according to the invention generally comprise from 2% to 95% by weight, preferably from 5% to 75% by weight, particularly preferably from 5% to 50% by weight, very particularly preferably from 5% to 35% by weight, of components a) and b). Furthermore, they preferably comprise further auxiliaries, in particular those mentioned above, in an amount of from 0.001% to 20% by weight, preferably from 0.1% to 15% by weight and particularly preferably from 0.1% to 10% by weight and preferably water as the balance.

Preferred liquid biocide mixtures according to the invention are characterized in that they comprise a total of from 2% to 95% by weight, preferably from 5% to 75% by weight, in particular 5% to 50% by weight, very particularly preferably from 5% to 35% by weight, of components a) and b), 0.001% to 20% by weight, preferably from 0.1% to 15% by weight and particularly preferably from 0.1% to 10% by weight of at least one auxiliary, preferably one or more of the abovementioned auxiliaries, and water as the balance.

Preferably, the biocide mixtures according to the invention, in the form of their liquid formulation, comprise at least 90% by volume of all solid particles at a particle size of less than 150 μm, preferably less than 100 μm, particularly preferably less than 50 μm and very particularly preferably less than 20 μm.

Process

The invention also relates to a process for preparing the biocide mixture according to the invention, said process being characterized in that i) biocides of components a) and b) are preferably mixed in water ii) optionally one or more auxiliaries that are also to be used are added iii) homogenization, optionally comminution, is performed preferably by means of shear forces, in particular until at least 90% by volume of the solid particles are present at a particle size of less than 150 μm, preferably less than 100 μm, particularly preferably less than 50 μm and very particularly preferably less than 20 μm iv) and optionally one or more further auxiliaries that are also to be used, in particular thickeners and/or in-can preservatives, are added and v) the dispersion obtained is optionally dried.

In a preferred procedure, a liquid, preferably the dispersion medium water, is initially charged and components a) and b) and a dispersant and any further auxiliaries such as wetting agents, defoamers and/or in-can preservatives are added. This mixture is then homogenized preferably using a high-speed stirrer. Suitable as such are for example dissolvers or rotor-stator systems such as Ultraturrax, Dispermix, Dispermat, high-pressure dispersers, nozzle aggregates with axial flow-through, or similar systems that are known to those skilled in the art.

The dispersion obtained is then preferably treated with a mill, in particular a ball mill or basket mill, so that preferably at least 90% by volume of the solid particles are present at a particle size of less than 150 μm, preferably less than 100 μm, particularly preferably less than 50 μm and very particularly preferably less than 20 μm. A thickener is preferably added before, during or after the grinding in order to set a desired viscosity.

If the solids used already have an appropriate particle size, grinding may also be omitted.

In a preferred embodiment, steps i) to iv) of the process according to the invention are performed at a temperature in the range from 5° C. to 40° C., in particular at 10° C. to 30° C., particularly preferably at a temperature of less than 30° C.

The liquid formulations, such as in particular the aqueous dispersions, can be prepared in a manner known per se for example by comminuting components a) and b) together with the further auxiliaries that are to be present in the liquid formulation or by intimately mixing the particulate components a) and b) and the further substances that are to be present in the liquid formulation with one another by means of a dissolver or stirrer.

Coating Composition

The invention also relates to coating compositions comprising the biocide mixture according to the invention or the components a) and b) of the biocide mixture according to the invention, the weight ratio of components a) to b) being from 6:1-1:6, preferably from 1.8:1-1:6, in particular from 1.5:1-1:6 at least one binder, optionally pigments and/or paints and water.

Preferably, the coating composition according to the invention comprises 0.1% to 5% by weight, in particular 0.3% to 3% by weight, preferably from 0.3% to 2% by weight, of the biocide mixture according to the invention or 0.02%-5.0% by weight, preferably 0.1%-1.5% by weight, especially preferably 0.2%-0.8% by weight, of components a) and b) of the biocide mixture according to the invention, the weight ratio of components a) to b) being from 6:1-1:6, preferably from 1.8:1-1:6, in particular from 1.5:1-1:6.

The proportion of the binder in the coating composition according to the invention is preferably from 5% to 80% by weight, in particular from 10% to 60% by weight.

The preferred binder used is a preferably film-forming binder, in particular an acrylate-, alkyd-, urethane-, styrene- or vinyl acetate-based binder and hybrid systems thereof. The amount of binder is preferably from 10% to 60% by weight based on the coating composition.

Also preferably, the coating composition according to the invention may comprise solvents and/or dispersants, optionally fillers, optionally wetting agents and optionally other additives such as defoamers.

Furthermore, the coating composition according to the invention may also comprise solvents such as glycols and glycol ethers, in-can preservatives, and optionally further additives, such as defoamers, thickeners, wetting agents, anti-settling agents and dispersants. Examples of such auxiliaries are those mentioned above.

Process for Inhibiting or Controlling the Growth of Molds

The invention also relates to a non-therapeutic process for inhibiting or controlling the growth of molds found on or in surface coatings, characterized in that the coating is formed by applying a coating composition to a surface and the coating composition is the coating composition according to the invention or comprises the biocide mixture according to the invention.

Molds against which the process according to the invention provides particularly effective protection are preferably the Ascomycetes and Deuteromycetes, in particular *Asper-*

*gillus niger, Aspergillus versicolor, Cladosporium cladosporioides, Stachybotrys chartarum* and *Trichoderma virens.*

The coatings which are to be protected using the process according to the invention are preferably obtained by applying and drying the coating composition on a surface preferably as a continuous, solid film that adheres to the surface.

EXAMPLES

Example 1: Preparation of Azoxystrobin/IPBC Dispersions

The dispersions were prepared in the manner known to those skilled in the art.

Preparation of an Azoxystrobin/IPBC Dispersion Using the Example of a 1:1 Mixture:

327.6 g of water is initially charged. 5 g of an EO/PO block copolymer-based emulsifier (Pluronic® F127 Prill, BASF), 7.5 g of a polyvinylpyrrolidone-based protective colloid (Sokalan® VA 64, BASF) and 5 g of a polyacrylate-based dispersant (Dispex® AA4144, BASF) are added in succession and homogenization is performed.

Under high shear forces (dissolver), 75 g of azoxystrobin and 75 g of IPBC are added in succession and homogenization is performed. During the homogenization, 1.63 g of a silicone-based defoamer (Xiameter Antifoam 1530) is added.

The dispersion obtained is finely ground using a bead mill (DynoMill Multilab) until a particle size (d90) of less than 20 µm has been achieved.

Subsequently, 0.2% of an in-can preservative (Preventol BIT 20D, 20% aqueous dispersion) is added and the mixture is thickened using 0.45% of xanthan gum. A biocide mixture having a content of 15% by weight of each of the active ingredients azoxystrobin and IPBC was obtained.

All other mixtures with other mixing ratios were likewise prepared according to this method.

Example 2: Comparative Efficacy Against Molds

Kresoxim-methyl mixtures from JP-A-2003073211 were directly compared with the corresponding AZO/IPBC mixtures according to the invention with respect to their efficacy against molds (see Table 1).

For this purpose, pieces of mycelium were punched out of a colony of the appropriate mold and incubated at 26° C. on a nutrient agar containing malt extract. Here, hyphal growth with and without active ingredient was compared. The concentration which completely suppressed radial hyphal growth was given as the minimum inhibitory concentration (MIC).

TABLE 1

| | | MIC (ppm) | | |
|---|---|---|---|---|
| | | Cladosporium cladosporioides | Stachybotrys chartarum | Trichoderma virens |
| AZO:IPBC | 1:1 | 2 | 1 | 2 |
| AZO:IPBC | 1:4 | 2 | 1 | 1 |
| Kresoxim-methyl:IPBC | 1:1 | 5 | 5 | 5 |
| Kresoxim-methyl:IPBC | 1:4 | 5 | 5 | 5 |

The significantly increased efficacy of the biocide mixture according to the invention compared with the kresoxim-methyl/IPBC mixture from JP-A-2003073211 is apparent from the comparison according to Table 1.

Example 3: Synergism Tests

Pieces of mycelium were punched out of a colony of the appropriate mold and incubated at 26° C. on a nutrient agar containing malt extract. Here, hyphal growth with and without active ingredient was compared. The concentration which completely suppressed radial hyphal growth was given as the minimum inhibitory concentration (MIC).

The synergism was determined according to the method described by Kull et al. (F. C. Kull, P. C. Eismann, H. D. Sylvestrowicz, R. L. Mayer, Applied Microbiology 1961, 9, 538-541). The following relationships apply:

$$\frac{Q_A}{Q_a} + \frac{Q_B}{Q_b} = SI$$

SI=1 means additivity

SI>1 means antagonism

SI<1 means synergism $Q_a$=concentration of substance A which is the MIC $Q_b$=concentration of substance B which is the MIC $Q_A$=concentration of substance A in the concentration of A/B at which microbial growth is suppressed $Q_b$=concentration of substance B in the concentration of A/B at which microbial growth is suppressed 3.1 Combinations of AZO and IPBC Against the Molds *Aspergillus niger* and *Aspergillus versicolor*

TABLE 2

| | | MIC (ppm) | | SI | |
|---|---|---|---|---|---|
| | | Aspergillus niger | Aspergillus versicolor | Aspergillus niger | Aspergillus versicolor |
| AZO | | 5000 | 100 | | |
| AZO:IPBC | 6:1 | 5 | 1 | 0.70 | 0.15 |
| AZO:IPBC | 3:1 | 2 | 1 | 0.50 | 0.26 |
| AZO:IPBC | 2:1 | 2 | 1 | 0.66 | 0.34 |
| AZO:IPBC | 1:1 | 1 | 1 | 0.50 | 0.51 |
| AZO:IPBC | 1:2 | 1 | 1 | 0.67 | 0.67 |
| AZO:IPBC | 1:3 | 1 | 1 | 0.75 | 0.75 |
| AZO:IPBC | 1:6 | 1 | 1 | 0.86 | 0.86 |
| IPBC | | 1 | 1 | | |

The synergy of the biocide mixture according to the invention compared with the individual active ingredients in the case of various molds is apparent from the series of tests according to Table 2.

3.2 Combinations of AZO and IPBC Against the Mold *Trichoderma virens*

TABLE 3

| | MIC against Trichoderma virens (ppm) | SI |
|---|---|---|
| AZO | 1000 | |
| AZO:IPBC 2:1 | 5 | 0.83 |
| AZO:IPBC 1:1 | 2 | 0.50 |
| AZO:IPBC 1:2 | 1.5 | 0.50 |
| AZO:IPBC 1:3 | 1 | 0.38 |
| AZO:IPBC 1:6 | 1 | 0.43 |
| IPBC | 2 | |

The synergy of the biocide mixture according to the invention compared with the individual active ingredients in the case of various molds is apparent from the series of tests according to Table 3.

3.3 Combinations of AZO and IPBC Against the Mold *Cladosporium cladosporioides*

TABLE 4

| | MIC against Cladosporium cladosporioides (ppm) | SI |
|---|---|---|
| AZO | 5 | |
| AZO:IPBC 1:1 | 2 | 0.70 |
| AZO:IPBC 1:2 | 2 | 0.80 |
| AZO:IPBC 1:3 | 2 | 0.85 |
| AZO:IPBC 1:6 | 2 | 0.92 |
| IPBC | 2 | |

The synergy of the biocide mixture according to the invention compared with the individual active ingredients in the case of various molds is apparent from the series of tests according to Table 4.

3.4 Combinations of AZO and IPBC Against the Mold *Stachybotrys chartarum*

TABLE 5

| | MIC against Stachybotrys chartarum (ppm) | SI |
|---|---|---|
| AZO | 100 | |
| AZO:IPBC 6:1 | 10 | 0.37 |
| AZO:IPBC 3:1 | 5 | 0.29 |
| AZO:IPBC 2:1 | 10 | 0.73 |
| AZO:IPBC 1:1 | 1 | 0.11 |
| AZO:IPBC 1:2 | 1 | 0.14 |
| AZO:IPBC 1:3 | 1 | 0.15 |
| AZO:IPBC 1:6 | 1 | 0.17 |
| IPBC | 5 | |

The synergy of the biocide mixture according to the invention compared with the individual active ingredients in the case of various molds is apparent from the series of tests according to Table 5.

Example 4: Protection Against Molds of a Coat of Acrylic Paint

A water-based white acrylic paint of the following composition (see Table 6):

TABLE 6

| Constituent | % |
|---|---|
| dist. $H_2O$ | 16.00 |
| Propylene glycol (solvent) | 1.00 |
| Foamex 845 (defoamer) | 0.60 |
| AMP 90 (wetting agent) | 0.30 |
| Preventol BM 5 (in-can preservative) | 0.30 |
| Edaplan 480 (wetting agent and dispersant) | 0.70 |
| Byk D 420 (anti-settling agent) | 0.50 |
| Tronox R-KB-6 (titanium dioxide; pigment) | 20.00 |
| Alberdingk AC 2736 VP (acrylate binder) | 57.00 |
| Texanol (solvent) | 1.00 |
| Byk 346 (substrate wetting agent) | 0.50 |
| Acrysol RM 2020 E (thickener) | 1.60 |
| Acrysol RM 825 (thickener) | 0.50 |
| | 100.00 |

was treated with the combination of 0.67% of the biocide mixture according to the invention based on the paint from Example 1 (corresponding to 0.1% of AZO and 0.1% of IPBC based on the paint) and tested in comparison with the corresponding untreated paint according to the British Standard BS 3900-Part G 6 (Test for Paints-Assessment of resistance to fungal growth) test method.

The paints were painted onto pine wood and then the painted wooden test specimens were conditioned at 23° C. for 7 days. After subsequent artificial weathering (QUV weathering device from Q-Panel Lab Products), the wooden test specimens were incubated with a mold mixture and incubated in a humidity chamber for 12 weeks. The following molds were used:

*Aspergillus versicolor*
*Aureobasidium pullulans*
*Cladosporium cladosporioides*
*Penicillium purpurogenum*
*Chaetomium globosum*
*Alternaria alternata*
*Phoma herbarum*
*Ulocladium atrum*
*Stachybotrys chartarum*

Test Result after 12 Weeks:

The non-fungicidally treated paint test specimens all exhibited a very high level of mold infestation (infestation of more than 70% of the total painted area).

The test specimens painted with the acrylic paint treated with the biocide mixture according to the invention (AZO/IPBC 1:1) were either completely free of mold infestation or exhibited only very slight traces of a mold infestation (infestation of less than 0.5% of the total painted area).

What is claimed is:

1. A biocide mixture comprising the biocides a) azoxystrobin (methyl(E)-2-{2-[6-(2-cyanophenoxy) pyrimidin-4-yloxy]phenyl}-3-methoxyacrylate) and b) IPBC (3-iodopropynyl N-butylcarbamate), wherein the weight ratio of components a) to b) is from 6:1-1:6.

2. The biocide mixture as claimed in claim 1, comprising components a) and b) at a total of more than 90% by weight based on the sum total of all biocides.

3. The biocide mixture according to claim 1, wherein said biocide mixture is in the form of a liquid comprising a total of 2% to 95% by weight of components a) and b).

4. The biocide mixture as claimed in claim 1, further comprising auxiliaries selected from the group of interface-active substances, defoamers, wetting agents, emulsifiers, dispersants, stabilizers, adhesives, protective colloids, spreading agents, fragrances, colorants, buffer substances, buffer systems, pH regulators, thickeners, dedusting agents, flow agents, release agents, in-can preservatives and mixtures thereof.

5. The biocide mixture as claimed in claim 1, comprising a total of from 2% to 95% by weight of components a) and b), 0.001% to 20% by weight of at least one auxiliary; and water as the balance.

6. The biocide mixture as claimed in claim 1, comprising a total of from 5% to 50% by weight of components a) and b), 0.001% to 20% by weight of at least one auxiliary; and water as the balance.

7. A process for preparing the biocide mixture as claimed in claim 1, comprising mixing components a) and b) in water, wherein the weight ratio of components a) to b) is from 6:1-1:6.

8. A coating composition comprising:

the biocide mixture as claimed in claim 1, wherein the weight ratio of components a) to b) is from 6:1-1:6; and comprising at least one binder, and water.

9. The coating composition as claimed in claim 8, wherein 0.1% to 5% by weight of the biocide mixture as claimed in claim 1 is present and the weight ratio of components a) to b) is from 6:1-1:6.

10. A non-therapeutic process for inhibiting or controlling the growth of molds on or in surface coatings, comprising forming a coating by applying a coating composition to a surface, wherein the coating composition is the coating composition as claimed in claim 8.

* * * * *